United States Patent Office 3,439,875
Patented Apr. 22, 1969

3,439,875
APPLICATION OF CHEMICAL SUBSTANCES
OVER LARGE AREAS
David Corbet Randall, Boundary House, Lady Margaret Road, Sunningdale, Berkshire, England, and Victor Edgar Sorapure, 23 Pembroke Place, Kensington, London W8, England
Filed Nov. 16, 1966, Ser. No. 594,842
Int. Cl. B05b 7/00; B60v 1/16
U.S. Cl. 239—8         8 Claims

ABSTRACT OF THE DISCLOSURE

A method and apparatus for dispersal of undesirable floating oil accumulations on a water surface by application of an emulsifying agent into the air stream of an air cushion vehicle and directing same in a manner creating turbulent condition and attacking both upper and under surfaces of the floating oil. An air cushion vehicle is provided having skirt means at the periphery thereof, said skirt means formed as a pair of depending skirt members spaced apart to define a peripheral duct terminating in a jet nozzle, fan means to force air into said duct and from said jet nozzle and spray means for dispensing an emulsifying agent from a source thereof carried by the vehicle to the vicinity of the jet nozzles whereby the emulsifying agent is entrained in the air stream from the jet nozzles and directed angularly both over and under the floating oil during travel of the air cushion vehicle. The skirt members terminate in arcuate portions directed inwardly relative the periphery of the vehicle to serve as stream guide means for the stream-emulsant mixture.

---

Figure 1:
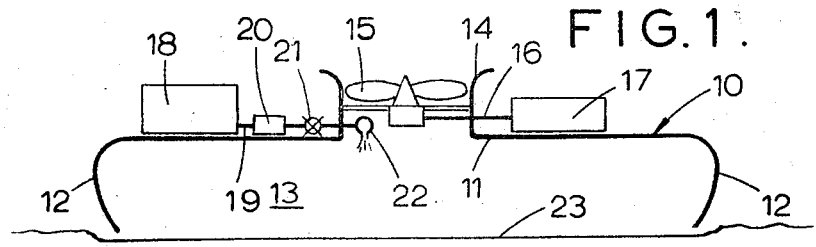

This invention relates to the application of chemical substances over large areas and has particular, but not exclusive, reference to the application of chemicals for the dispersion of oil that has contaminated water, such as oil undesirably discharged from ships. The invention will be described in relation to the application of oil dispersing chemicals on to water, but it is to be understood that it may be employed for the application of chemicals over large areas for other purposes.

When water has been contaminated, the present practice is to spray neat or diluted chemical substances through high pressure hoses carried out over the sides of ships moving slowly through the spillage, so as to cause localized turbulence and emulsification of the oil. This method has various disadvantages.

First, the employment of ships is a slow method of getting to the scene of the spillage, and a high manpower is required. Next, the method is very extravagant in the use of chemicals and has a slow application rate. Again, the method is limited by the depth of water and the manoeuvring space for vessels to operate. This is of prime importance in confined waters, where it may be impossible either because of congestion or the draught of the vessel to apply the chemical substance to disperse the oil spillage. Such conditions may arise in harbours or waterways where it is all the more desirable to remove the spillage.

It is an object of the invention to provide a method and means whereby oil spillage, especially in such difficult areas, may be dealt with more rapidly and efficaciously.

According to one aspect of the invention, a method of applying a chemical substance over a large area comprises carrying a supply of the substance in an air cushion vehicle and discharging it during travel of the vehicle in a pressure air stream derived from the pressure air supply of the vehicle.

The substance may be in liquid, powder, or granular form, and injected into a stream of pressure air, or it may be combined with a diluent prior to being injected into the the stream of pressure air.

It may be discharged within the space enclosed by the skirt of the vehicle, or outside the skirt.

According to another aspect of the invention, an air cushion vehicle for applying a chemical substance over a large area is provided with a reservoir for the substance and injection means to inject said substance into pressure air derived from the pressure air supply of the vehicle.

The injection means may be associated with a lift fan, and may comprise a nozzle or an atomiser. The injection means may be arranged to discharge into a plenum chamber or into the air cushion of the vehicle, or into a feed duct between a fan and the plenum chamber.

Alternatively, the injection means may be located externally relatively to the skirt of the vehicle. Thus, there may be a plurality of nozzles constituting one or more spray bars, and such spray bars may extend around the perimeter of the vehicle.

In the case of an air cushion vehicle provided with peripheral jets associated with a skirt, the injection means may be arranged to discharge into the jet nozzles.

The injection means may, of course, comprise a single nozzle or atomiser or a plurality of nozzles or atomisers.

Figure 2:
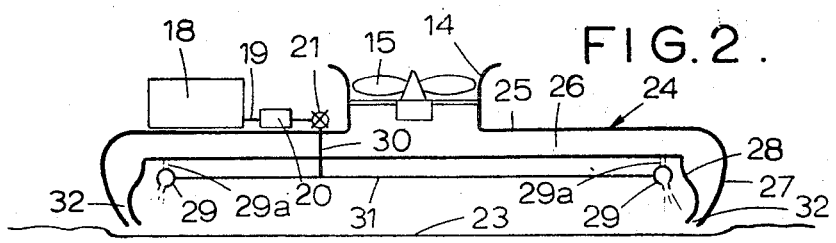
Figure 3:
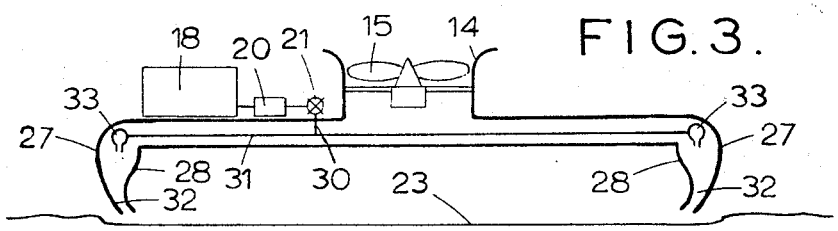
Figure 4:
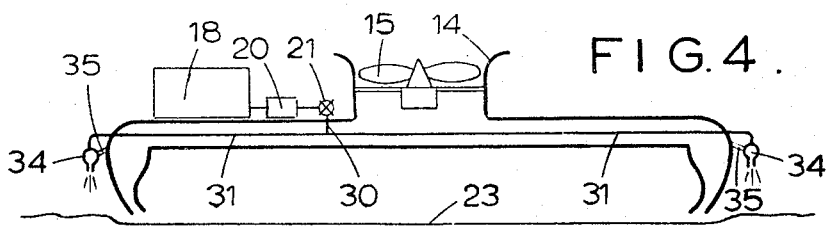
Figure 5:
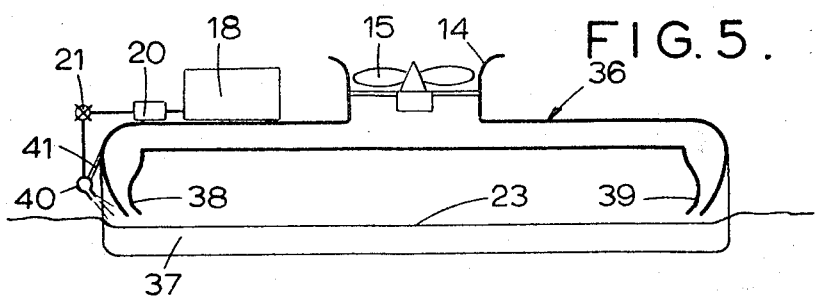

Embodiments of the invention will be described with reference to the accompanying drawings, in which:

FIGURE 1 is a diagrammatic transverse section of a plenum chamber air cushion vehicle, showing one embodiment of the invention, FIGURE 2 is a similar view of another embodiment in which a peripheral jet double skirted air cushion vehicle is provided with ducts discharging into the cushion area, FIGURE 3 is a similar view of another embodiment with the ducts in the peripheral jet passages, FIGURE 4 is a similar view of yet another embodiment having exterior spray bars, and FIGURE 5 is a diagrammatic longitudinal section showing a side wall craft fitted with a spray bar across the bows.

Referring to FIGURE 1 of the drawings, an air cushion vehicle, generally indicated at 10, is depicted in simple diagrammatic form, since the details of its construction are in the main irrelevant to the invention. A hard structure 11 has a skirt 12, which may be flexible if desired, and which encloses a plenum chamber 13. Air is fed to the plenum 13 through a duct 14 by a fan 15 driven through a shaft 16 by a power unit 17. The vehicle 10 is provided with a reservoir containing in liquid form an oil dispersing chemical marketed under the trade name "Slix." The reservoir is in the form of a tank 18 located in any suitable part of the vehicle 10 and having a feed line 19 serving a pump 20 which forces the liquid under suitable pressure through a control valve 21 to an atomiser 22 into the feed duct 14 serving the plenum chamber 13. The valve 21 and suitable control arrangements (not shown) for the pump are provided so that injection of the chemical substance into the duct 14 may take place as and when desired.

When the reservoir 18 and pump 20 are shut off from the duct 14, the vehicle 10 operates as an ordinary air cushion vehicle, and may be brought speedily to the oil contaminated area. By the inherent nature of the air cushion vehicle it is not prevented from entering any waters however shallow. When the vehicle has reached the contaminated area, the valve 21 is opened, and the chemical substance is forced by the pump 20 into the duct 14 in atomized form and is directed downwardly under pressure derived from the pressure air of the vehicle. The atomized substance is discharged on to the surface of the water indicated at 23, and the turbulence occasioned by the generation of the air cushion causes the chemical substance to be spread widely over the contaminated surface so as to emulsify the contaminant and the chemical substance with the water.

Referring to FIGURE 2, in another embodiment, a vehicle 24 has a hard structure 25 arranged to accommodate a duct 26 provided with pressure air by a fan 15. In this and subsequent figures, the power plant 17 of FIGURE 1 to drive the fan 15 is omitted for simplicity. The vehicle 24 has an outer flexible skirt 27 and inner flexible skirt 28 arranged to constitute peripheral nozzles 32. Suspended from the hard structure 25 just inboard of the skirts, by brackets 29a, is a peripheral spray bar 29 served by pipes 30, 31 supplied through a valve 21. The arrangements for storing the oil dispersing chemical and pumping it to the valve 21 are the same as for the embodiment of FIGURE 1.

The spray of the oil dispersing chemical issuing from the spray bar 29 is entrained by the pressure air issuing from the nozzles 32 into the turbulence caused by the generation of the cushion.

Such entrainment may if desired be accomplished by placing the spray bar in the path of the pressure air delivered to the nozzles. This is illustrated in FIGURE 3, which shows a peripheral spray bar 33 arranged between an outer skirt 27 and an inner skirt 28 so as to discharge the spray of the chemical into the path of the pressure air supplied by the fan to the nozzles 32.

Instead of locating the atomizers or spray bars inside the cushion, or in the path of the pressure air to the nozzles of the skirt, they may be located outside the skirt of the vehicle. FIGURE 4 shows an arrangement in which pipes 30, 31 served by the valve 21 are led outboard to supply a spray bar 34 hung on brackets 35 extending outwardly from the hard structure of the vehicle. The spray bar 34 is arranged to deliver the spray of chemical into the disturbed area which is generally to be found just outboard of the skirt of the vehicle.

FIGURE 5 illustrates a modification of this arrangement, as applied to a sidewall vehicle 36 having sidewalls 37 and transverse skirts 38, 39 across the bow and stern of the vehicle. A spray bar 40 is arranged across the bow on brackets 41. The location of the pump 20 and valve 21 is modified merely because only the spray bar 40 is employed.

It will be appreciated that the design of the spray bars, nozzles and atomisers will depend on the physical characteristics of the substance to be sprayed. The location of the components required to deliver the spray to the spray bars will depend upon the type of air cushion vehicle employed. Thus, the reservoir 18 will be located in the position most suitable for the trimming of the vehicle.

The use of an air cushion vehicle according to the invention enables the vehicle to get to the scene of the spillage more rapidly than heretofore, so that remedial action may be taken in a relatively small area and before the oil spillage has had a chance to spread. The air cushion vehicle not only requires a very low man-power, as compared with the displacement craft heretofore used, but enables maximum use and control of the chemical substance discharged to be accomplished, and the use of the air cushion pressure gives a high application and emulsification rate, comparing favourably with the hoses at present employed.

In addition to the treatment of oil spillage on water, the air cushion vehicle according to the invention may be used for other purposes quite impossible for the vessels hitherto employed. Thus, it may be used over land where, for example, an aircraft has crashed on marshy land or mud flats and a fuel spillage has to be rendered safe. The air cushion vehicle can indeed operate over surfaces impossible either for displacement craft or wheeled vehicles, and an air cushion vehicle suitable for use in one set of circumstances may be readily adapted for use in other circumstances with other chemical substances, such as foam generating material.

Such uses may be crop spraying or dusting, pest control, e.g., in marshy areas, or treatment of roads or other prepared surfaces with deicing compounds.

We claim:

1. A method of chemical spraying to an underlying surface and utilizing an air cushion vehicle having inner and outer peripheral skirts defining a directive duct for support air flow stream for the vehicle; said method comprising the steps of carrying the chemical agent in the vehicle, discharging the chemical agent in close vicinity of the skirts of the vehicle and thereby entraining the chemical agent into the support air flow stream.

2. The method as claimed in claim 1 in which the chemical agent is discharged directly in the flow stream within the duct and is applied both under and over the receiving surface.

3. The method as claimed in claim 1 and the step of combining the chemical agent with a diluent prior to the discharge and entraining step.

4. The method as claimed in claim 1 in which the chemical agent is injected into the flow stream in a direction angularly inward of the circumferential edge of the vehicle.

5. In an air cushion vehicle for applying a chemical agent to a surface area wherein said vehicle comprises air flow generating means, an air deflection system for propelling the vehicle, the air deflection system including skirt means arranged at the peripheral edge of said vehicle and means for directing air flow about said skirt means, means carried by said vehicle for storing the chemical agent and spray nozzle means for discharging the chemical agent into the turbulence generated during propulsion of the vehicle, conduit means communicating between the storage and nozzle means; the improvement comprising skirt means formed of a pair of downwardly depending spaced skirt members arranged at the peripheral edge of the vehicle to define a duct, one end thereof communicating with the air flow and the other opposite end defining a jet nozzle, the spray nozzle means disposed in close vicinity to said jet nozzle whereby the chemical agent is entrained into the air stream in the vicinity of said jet nozzle.

6. The structure as claimed in claim 5 wherein said skirt members each terminate in an arcuate portion directed inwardly relative to the periphery of said vehicle.

7. The structure as claimed in claim 5 in which the spray nozzles are disposed within the duct and open directly to said jet nozzles.

8. The structure as claimed in claim 6 in which the spray nozzles are disposed to direct the chemical agent against said arcuate portion of the skirt means.

References Cited

UNITED STATES PATENTS 3,240,282 3/1966 Taylor _____ 180—128
3,341,125 9/1967 Sweeney et al. _____ 239—8

EVERETT W. KIRBY, *Primary Examiner.*

U.S. Cl. X.R.

180—128; 239—77, 171